US012409629B2

(12) United States Patent
Melzer

(10) Patent No.: US 12,409,629 B2
(45) Date of Patent: Sep. 9, 2025

(54) METHOD FOR PRODUCING PAPER SACKS AND PAPER SACKS

(71) Applicant: MONDI AG, Vienna (AT)

(72) Inventor: Max Melzer, Oschatz (DE)

(73) Assignee: MONDI AG, Vienna (AT)

( * ) Notice: Subject to any disclaimer, the term of this patent is extended or adjusted under 35 U.S.C. 154(b) by 0 days.

(21) Appl. No.: 18/702,034

(22) PCT Filed: Nov. 30, 2022

(86) PCT No.: PCT/EP2022/083772

§ 371 (c)(1),
(2) Date: Apr. 17, 2024

(87) PCT Pub. No.: WO2023/117339

PCT Pub. Date: Jun. 29, 2023

(65) Prior Publication Data

US 2024/0399698 A1 Dec. 5, 2024

(30) Foreign Application Priority Data

Dec. 22, 2021 (DE) ..................... 10 2021 134 238.4

(51) Int. Cl.
*B31B 70/00* (2017.01)
*B31B 70/81* (2017.01)
*B31B 70/26* (2017.01)
*B31B 150/00* (2017.01)

(52) U.S. Cl.
CPC .......... *B31B 70/8122* (2017.08); *B31B 70/26* (2017.08); *B31B 2150/003* (2017.08)

(58) Field of Classification Search
CPC ...... B65D 31/142; B65D 31/08; B65D 31/04; B65D 31/02; B65D 33/01; B65D 31/14; B65D 33/18
USPC ................................ 493/210, 217, 212, 235
See application file for complete search history.

(56) References Cited

FOREIGN PATENT DOCUMENTS

| | | | | |
|---|---|---|---|---|
| CA | 2196923 A1 | 8/1998 | | |
| CN | 204507614 U | 7/2015 | | |
| CN | 205327726 U | 6/2016 | | |
| DE | 10 2014 206 790 A1 | 10/2015 | | |
| DE | 10 2017 004 268 A1 | 11/2018 | | |
| DE | 102018114001 A1 | * 12/2019 | | B65D 30/08 |
| EP | 3 017 940 B1 | 11/2014 | | |
| WO | 2018/202340 A1 | 11/2018 | | |

* cited by examiner

*Primary Examiner* — Jacob A Smith
(74) *Attorney, Agent, or Firm* — WCF IP

(57) ABSTRACT

The invention relates to a method for producing paper sacks comprising the following steps:
providing a tube section (2) that comprises at least a first paper layer (4) and a second paper layer (6), wherein the first tube section (2) has a first end (8) and an opposite second end (10), and a longitudinal extension which extends from the first end (8) to the second end (10), and
the first end (8) is formed by the first paper layer (4) and the second end (10) by the second paper layer (6),
forming a first base (12) at the first end (8) and
forming a second base (14) at the second end (10).

9 Claims, 1 Drawing Sheet

METHOD FOR PRODUCING PAPER SACKS AND PAPER SACKS

Figure 1:
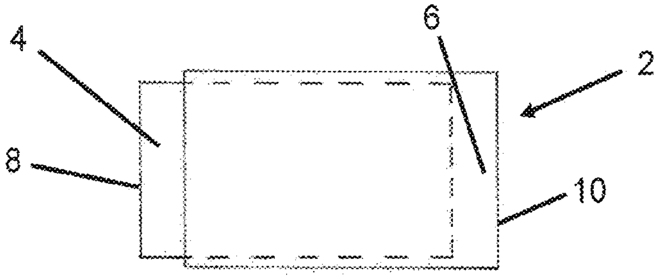

The invention relates to a method for producing paper sacks. The invention also relates to paper sacks produced according to said method.

Paper sacks have been known from the prior art for many years and are used to transport various materials. In particular, they are used to package bulk goods, especially powdery bulk goods, for example building materials such as mortar or cement. Paper sacks are also used as paper bags, for example grocery bags or environmentally-friendly packaging, for smaller and relatively light general goods, such as kitchen roll or toilet roll.

One of the main advantages of paper sacks compared with plastic packaging is their environmental sustainability, as they are at least partially, but often completely, recyclable and can be re-utilized. Once they have been used in the intended manner, during which they may become damaged or destroyed, they are recycled, for example as waste paper. Nevertheless, there is still a wide array of goods and objects that are not packaged in paper sacks, but are transported and shipped in plastic packaging. Examples include pillows or duvets. For cost reasons, they are often not packaged in paper sacks, but shrink-wrapped in plastic foil or packaged in plastic sacks or plastic bags.

The invention aims to propose a method for producing paper sacks that allows the paper sacks to be produced efficiently and manufacturing costs to be thus reduced.

The invention solves the addressed task by way of a method for producing paper sacks comprising the following steps:

- providing a tube section that comprises at least a first paper layer and a second paper layer, wherein
  - the first tube section has a first end and an opposite second end, and a longitudinal extension which extends from the first end to the second end.
  - the first end is formed by the first paper layer and the second end by the second paper layer,
- forming a first base at the first end and
- forming a second base at the second end.

The method according to the invention renders it possible to produce two paper sacks at the same time. To this end, a tube section is first provided. It can either be prefabricated, for example purchased or delivered, or manufactured. Preferably, the tube section is produced within the scope of the method. To this end, a flat paper web is provided that comprises at least the first paper layer and the second paper layer. These are then used to form an endless tube, which likewise comprises the two paper layers. The endless tube is subsequently divided, for example cut, into individual tube sections, which are then further processed in the method.

The tube section has a first end and a second end located opposite each other. The longitudinal extension of the tube section extends between the two of them. The direction in which the longitudinal extension extends is the longitudinal direction of the tube section. Once a tube section has been provided, the first base is formed at the first end and the second base at the second end. The first base and/or the second base are preferably a star seal. In order to form said seal, base flaps are formed at the respective end of the tube section, said flaps then preferably being glued together using, for example, a starch adhesive. Additional paper sheets can be used to reinforce the star seal. Professionals are familiar with the production of star seals from the prior art.

The first base and/or the second base may also be designed as a simple bottom seal. To form such a bottom seal, the respective end of the tube section is preferably folded down and, for example, glued. This is also known to professionals from the prior art.

For the method according to the invention, it is important that the first end of the tube section is only formed by the first paper layer and the second end of the tube section only by the second paper layer. This means that on the one side, where the first end is found, the first paper layer protrudes beyond the second paper layer in the longitudinal direction. This ensures that the first end of the tube section is only formed by the first paper layer. On the opposite side, where the second end is found, the second paper layer protrudes beyond the first paper layer in the longitudinal direction. This ensures that the second end of the tube section is only formed by the second paper layer.

Preferably, the first paper layer and the second paper layer are not connected to each other. In particular, there is preferably no adhesive connection or otherwise material connection between the first paper layer and the second paper layer. This ensures that the method produces two individual paper sacks which each have a base on one side and are arranged inside one another. However, the paper sacks are not connected to each other and can be separated by exerting tensile forces along the longitudinal direction.

Preferably, the first base and the second base are formed at the same time. This reduces manufacturing time and therefore further reduces manufacturing costs.

Alternatively, it may also be advantageous to join the first paper layer and the second paper layer. This can prevent, for example, the first paper layer and the second paper from being separated earlier than intended during manufacturing. For example, stitching and/or glueing are/or used to join the two paper layers. The holding force generated by joining the paper layers is preferably so small that it is overcome when the paper layers are removed from one another once the two bases have been formed.

In a preferred embodiment, the first base is not formed with the paper of the second paper layer and the second base is not formed with the paper of the first paper layer.

Individual reinforcement sheets can be used for one of the two bases or for both bases, said sheets strengthening the respective base, for example; however, the respective other paper layer is not used in this embodiment so as to ensure that two separate paper sacks are created which can be easily detached from one another.

Preferably, the first paper layer and the second paper layer have the same expansion along the longitudinal extension in the direction of longitudinal extension before the first base and the second base are formed. This means that the two paper layers are the same length in the longitudinal direction of the tube section. This is advantageous, but not essential. Two paper layers can also be used that have different dimensions in this direction. In this case, two differently-sized paper sacks are preferably produced.

Preferably, the first and the second paper layer are separated from each other once the first base and the second base have been formed. This is preferably achieved by pulling them apart along the longitudinal extension.

Preferably, the tube section has multiple first paper layers and/or multiple second paper layers. Together, the first paper layers form a multi-layered first paper sack. Together, the second paper layers form a multi-layered second paper sack. The tube section preferably comprises two or three first paper layers. The tube section preferably comprises two or three second paper layers.

In a preferred embodiment of the method, the first paper layers are joined together. Alternatively or additionally, the second paper layers are joined together. The joined paper layers are preferably glued together or tacked to one another.

The invention also solves the addressed task by way of a system with two paper sacks, which have been produced according to the method described here, the two paper sacks each comprising an opening and a base and a first paper sack protruding with its opening into a second paper sack.

Figure 2:
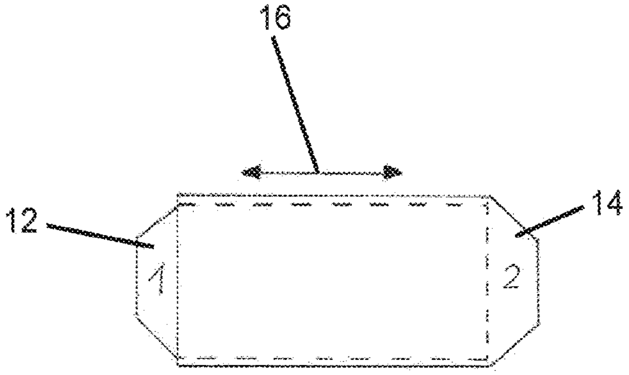
Figure 3:
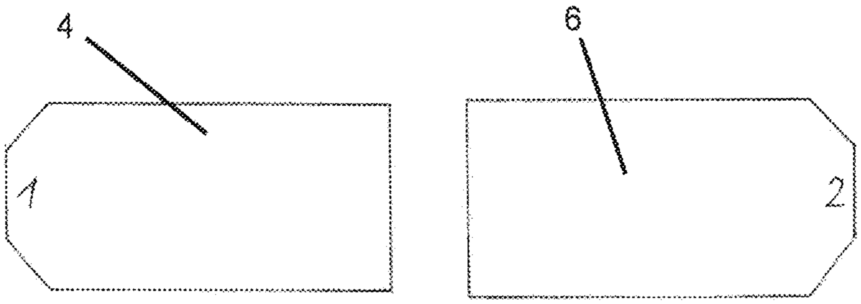

In the following, an embodiment example of the invention will be explained in more detail with the aid of the accompanying figures. They show:

FIGS. 1 to 3—schematic representations of various stages during a method according to an embodiment example of the present invention.

FIG. 1 depicts a tube section 2 that comprises a first paper layer 4 and a second paper layer 6. The first paper layer 4 is arranged inside the second paper layer 6, which is depicted by the dashed line. In FIG. 1, the first paper layer protrudes to the left beyond the second paper layer 6, where it forms a first end 8. In FIG. 1, the second paper layer 6 protrudes to the right beyond the first paper layer 4, where it forms a second end 10.

FIG. 2 shows the situation after a first base 12 has been formed at the first end 8 and a second base 14 has been formed at the second end 10. The double arrow 16 illustrates that the first paper layer 4 and the second paper layer 6 can be moved freely against each other in these directions.

In FIG. 3 the two paper layers 4, 6 have been moved against each other in the direction of the double arrows from FIG. 2. The first paper layer forms the first paper sack and the second paper layer 6 forms a second paper sack.

REFERENCE LIST

2 tube section
4 first paper layer
6 second paper layer
8 first end
10 second end
12 first base
14 second base
16 double arrow

The invention claimed is:

1. A method for producing paper sacks, comprising:
providing a tube section that comprises at least a first paper layer and a second paper layer, wherein
the tube section comprises a first end and a second end, and a longitudinal extension which extends from the first end to the second end, and
the first end is formed by the first paper layer and the second end is formed by the second paper layer,
forming a first base at the first end of the tube section, and
forming a second base at the second end of the tube section,
wherein the first base is not formed with paper of the second paper layer, and the second base is not formed with paper of the first paper layer.

2. The method according to claim 1, wherein the first paper layer and the second paper layer are not connected to each other.

3. The method according to claim 1 wherein the first base and the second base are formed at the same time.

4. The method according to claim 1 wherein the first paper layer and the second paper layer each have an expansion along a longitudinal extension in a direction of longitudinal extension that is equivalent before the first base and the second base are formed.

5. The method according to claim 1 wherein the first paper layer and the second paper layer are separated from each other after the first base and the second base are formed.

6. The method according to claim 5, wherein the first paper layer and the second paper layer are separated from each other by being pulled apart along a longitudinal extension.

7. The method according to claim 1 wherein the tube section comprises the first paper layer and one or more additional first paper layers, and/or
comprises the second paper layer and one or more additional second paper layers.

8. The method according to claim 7, wherein the first paper layer and the one or more additional first paper layers are joined together and/or wherein the second paper layer and the one or more additional second paper layers are joined together.

9. A system, comprising two paper sacks, wherein each of the two paper sacks are produced by a method according to claim 1, wherein the two paper sacks each have an opening and a base, and wherein a first paper sack of the two paper sacks protrudes with its opening into a second paper sack of the two paper sacks.

* * * * *